United States Patent [19]

Huber

[11] Patent Number: 5,626,288

[45] Date of Patent: May 6, 1997

[54] PROCESS AND APPARATUS FOR VENTILATING AN ENCLOSED SPACE

[76] Inventor: Jakob Huber, 8 Chemin des Avenyers, 1806 St. Legier, Switzerland

[21] Appl. No.: 466,352

[22] Filed: Jun. 6, 1995

[30] Foreign Application Priority Data

Jan. 26, 1994 [CH] Switzerland ............... 3201/94

[51] Int. Cl.⁶ ............................................. F24F 7/013
[52] U.S. Cl. ............................... 236/49.3; 165/248
[58] Field of Search ......................... 236/49.3; 165/16, 165/248, 291

[56] References Cited

U.S. PATENT DOCUMENTS

| | | |
|---|---|---|
| 3,528,606 | 9/1970 | Witten . |
| 4,006,672 | 2/1977 | Matsuyoshi et al. . |
| 4,136,822 | 1/1979 | Felter . |
| 4,251,026 | 2/1981 | Siegel et al. ............... 236/49.3 |
| 4,493,456 | 1/1985 | Sarazen, Jr. et al. . |
| 4,527,247 | 7/1985 | Kaiser et al. . |
| 4,587,892 | 5/1986 | Witten et al. . |
| 4,602,739 | 7/1986 | Sutton, Jr. ............... 236/49.3 |
| 4,669,371 | 6/1987 | Sarazen, Jr. et al. . |
| 4,702,149 | 10/1987 | Speer . |
| 4,715,532 | 12/1987 | Sarazen, Jr. et al. . |
| 4,742,475 | 5/1988 | Kaiser et al. . |
| 4,754,696 | 7/1988 | Sarazen et al. . |
| 4,776,385 | 10/1988 | Dean ........................ 236/49.3 |
| 4,829,882 | 5/1989 | Jackson . |
| 4,877,182 | 10/1989 | Pugh et al. . |
| 4,953,450 | 9/1990 | Remondino . |
| 4,962,882 | 10/1990 | Sarazen, Jr. et al. . |
| 5,000,381 | 3/1991 | Mueller et al. ............... 165/16 |
| 5,125,571 | 6/1992 | Heber ........................ 236/49.3 |
| 5,253,804 | 10/1993 | Sarazen, Jr. et al. . |
| 5,294,049 | 3/1994 | Trunkle et al. . |
| 5,364,026 | 11/1994 | Kundert ..................... 236/49.3 |
| 5,482,210 | 1/1996 | Carey et al. ............... 236/46 F |

Primary Examiner—William E. Tapolcai
Attorney, Agent, or Firm—Bell, Seltzer, Park & Gibson, P.A.

[57] ABSTRACT

A method and apparatus for ventilating an enclosed air space, such as the crawl space under a building, and which includes a controller which is switchable between a cooling mode which activates a ventilating fan upon the temperature in the space reaching a predetermined upper limit and the differential of the temperatures inside and outside of the space reaching a predetermined value, and a heating mode which activates the ventilating fan upon the temperature in the space reaching a predetermined lower limit and the differential of the temperatures inside and outside of the space reaching a predetermined value. The ventilating fan may also be activated by the presence of predetermined concentrations of dangerous or destructive gases, such as radon and water vapor.

14 Claims, 1 Drawing Sheet

5,626,288

PROCESS AND APPARATUS FOR VENTILATING AN ENCLOSED SPACE

FIELD OF THE INVENTION

The present invention relates to a process and apparatus for controlling the atmospheric conditions of an enclosed space, such as the unheated crawl space under a house, or an enclosed attic.

BACKGROUND OF THE INVENTION

A large majority of single family homes and other buildings have no basement, but rather are built upon a foundation which includes an enclosed crawl space between the ground and the sub-floor. The crawl space is typically enclosed with a brick and/or cinder bloc foundation wall, and to provide ventilation, the wall contains openings which are typically 8×16 inches and are located approximately every 10 feet apart. In most homes the openings are fitted with a louvered ventilator that can be manually opened and closed, although automatic ventilators which are temperature responsive are known, note, for example, U.S. Pat. No. 3,528,606.

The ventilation provided by the known systems is at best marginal and is often insufficient. In particular, an enclosed crawl space or attic becomes a pocket of cold air in the wintertime and a pocket of warm air in the summertime, which increases the load on the heating and air conditioning systems. Also, in the case of a crawl space, the high humidity level in the air, combined with the humidity escaping from the earth, are extremely destructive of the wooden materials used in most building structures. Also, insulating materials will become moist and lose most of their efficiency, making it easier for the heat in the summer and the cold in the winter to get into the living areas of the building. The moisture that can migrate through the floor and into the living areas of the building, especially during the summer, will further tax the air conditioning system, it will attack wallpaper, and it will encourage the growth of mildew and spores in closets and cabinets. Moist conditions under the building will also invite termites, which thrive in such an environment.

It is known that an air conditioning system can be used to cool and dehumidify an enclosed space, but such systems are expensive and consume a great deal of electrical energy. For these reasons, air conditioning systems cannot be justified for less demanding applications, such as the crawl space or attic of a building.

Where the enclosed space includes manually operable ventilators or windows, a simple way to achieve improved ventilation in the summertime is to open the ventilators or windows during the nighttime hours. However, if the ventilators or windows are not closed during the daytime hours the effect of the cooling is lost when warmer air gets back into the enclosed space. Also, the indoor and outdoor temperature has to be monitored. Despite the simplicity of the manual operation, personal attention is required. The same disadvantage exists in the wintertime when the enclosed space should be heated with available warmer outside air.

For storage of produce, aging of wine, a fermentation process, or in a chemical laboratory, the temperature range has to be kept within a narrow tolerance range or as constant as possible. Such applications demand an even higher degree of control and expenditure.

The accumulation of radon gas in enclosed air spaces is also of concern as a health hazard. Radon gas occurs naturally as a byproduct of decaying uranium and is found to some extent in nearly all soils and ground waters. The gas is thought to be dangerous and cancer causing if people are exposed to it for long periods or in high concentrations. The accumulation of radon gas can increase in rooms which are not adequately ventilated, and a foundation crawl space will often collect the gas if there is inadequate ventilation.

It is accordingly an object of the present invention to provide an efficient system for effectively ventilating an enclosed air space in a building structure, and which avoids the limitations and disadvantages of the known systems as described above.

It is a more specific object of the present invention to provide a method and apparatus for ventilating an enclosed air space in a building structure which efficiently controls the temperature and humidity in the enclosed space utilizing a minimum of energy.

It is a further object to provide a ventilating system of the described type which is able to economically control high concentrations of toxic or hazardous gases, and high levels of humidity, in an enclosed air space, such as a crawl space or attic of a building structure.

SUMMARY OF THE INVENTION

The above and other objects and advantages of the present invention are achieved by the provision of a method and apparatus which comprises sensing the temperature differential between the air in the space and the outside air, sensing a second variable parameter in the space, and actively ventilating the space so as to exchange air within the space with outside air upon both a predetermined temperature differential being sensed and a predetermined level of the second parameter being sensed.

In the preferred embodiment, the second parameter comprises the temperature within the space. Also, the ventilating system is activated upon (1) the temperature in the space reaching a predetermined upper limit, and the temperature of the outside air being below the temperature in the space by a predetermined differential, and so as to cool the space, and upon (2) the temperature in the space reaching a predetermined lower limit, and the temperature of the outside air exceeding the temperature in the space by a predetermined differential, and so as to warm the space.

The ventilating method and apparatus of the present invention may also include sensing the concentration of a specific gas, such as radon or water vapor, in the space, and activating the ventilating system upon the concentration of the specific gas in the space reaching a predetermined level. Where water vapor is being monitored, the ventilation system is preferably activated upon the concentration of the water vapor reaching a predetermined level and the temperature of the outside air being below the temperature of the air in the space.

In case the outside air falls below the freezing mark, the cold air could, e.g., damage water lines, produce, or containers filled with liquids which are located in the air space. In order to avoid such damage, a thermostat is provided, which can be set at e.g. 10° C. If the outside air temperature falls below that level the electrical circuit to the ventilator is interrupted and the ventilator rendered inactive.

There are also enclosed spaces that are not only too warm but also too humid. With the process of the present invention, humidity levels in the space can be lowered. Cooler outside air entering the space will mix with inside air and warm up. The additional capacity of warmer air to absorb more water will go into effect and will carry the moisture out of the space. The ventilation of the space will also eliminate or at least reduce the concentration of any other gases trapped in the space.

It is also possible that the enclosed air space contains goods or materials which demand a certain moisture content in the air. The ambient air cannot fall below a specific humidity level in order to prevent the goods from drying out. In such a case a humidity level control is added and set at a pre-selected level. If the humidity falls below that level the ventilation of the space is interrupted. If necessary, additional humidity can be provided, as is routinely done with an air conditioning installation.

The present invention permits an enclosed air space to be cooled or warmed through a controlled ventilation. An automated reversal from winter to summer and vice versa is also possible. Such a reversal can be used to keep the temperature in the space within a pre-set range. If the temperature exceeds the upper limit the space will be cooled down. If the temperature falls below the lower limit the space will be warmed up. During the day and night the process will need outside air, which is either cooler or warmer than the temperature in the space. In many geographic regions such temperature swings between day and night occur naturally. An adjustable minimal temperature differential between the outside and the inside air has to be present to initiate any cooling or warming.

Through selection of an optimal set point for the temperature differential between outside and inside air it can be avoided that the ventilator runs all night with minimal or no efficiency at all. A differential of e.g. only 1° C. will not bring the desired result and will not be economical from an energy standpoint.

It should also be mentioned that the cooling in the summer and the warming in the winter of the space under the dwelling will directly help to reduce the energy consumption needed for cooling or heating the living quarters throughout most of the year. With a controlled humidity level under the house, less moisture will migrate into the house, therefore, increasing the comfort level. It will also save energy needed to reduce high humidity levels in the house through an air conditioning system. Thus, optimal conditions can be achieved if the humidity levels are controlled at the same time.

If the presence of dangerous gases is suspected or known, an emergency ventilation cycle may be added to the process. Such a cycle is activated as soon as the respective instrument detects a high concentration of such a gas. Such a cycle will be dominant and will be activated regardless of air temperature or humidity level.

The emergency ventilation cycle can also be activated if high moisture content in the building material, normally in the wood structure, occurs. The moisture level is continuously monitored and measured. If a high and undesirable level of moisture is detected, the emergency ventilation is activated. During the winter months such an emergency cycle will in most cases have a positive result. However, during the summer months it will be necessary to first compare the outside to the inside temperature. As long as the outside temperature is not lower than the temperature in the space, there is the possibility that the outside air can aggravate the situation by leaving an additional film of water on the surface of the structure (condensation). That film of water will most likely be absorbed into the material.

The process can also be used when the space is filled with a liquid, e.g. a swimming pool, or in the chemical or food industry, when the cooling or warming of a liquid for control of a chemical or fermentation process is necessary.

The hardware for the process will vary depending on the desired application and results. The main difference will be in the sensors for the monitoring of the respective parameters. The hardware components and instruments are all readily available on the market and can, if necessary, be checked and re-calibrated by personnel with no special training.

An additional advantage can be achieved with a reversible motor for the ventilator that can be mechanically or electronically actuated. This creates the possibility for the ventilator to discharge air from the space or supply fresh air to the space. With such controls the process can select the direction of air flow. This can be advantageous for the described temperature control or the removal of dangerous gases. Such gases can develop during a fermentation process, or in a work shop. Also carbon monoxide, e.g. in a garage, will render such a space dangerous to enter. Such a reversed operation can be controlled by one of the special sensors, or it can be controlled by other conditions and activated by a more dominant control circuit.

For the same space several ventilators can be used. One or more, or all, preferably are reversible in the direction of air flow. Such an arrangement is particularly effective for large spaces or spaces with many dead corners or during the wintertime when normally all manual or automatic louvers are closed.

BRIEF DESCRIPTION OF THE DRAWINGS

Some of the objects and advantages of the present invention having been stated, others will appear as the description proceeds and when considered in conjunction with the accompanying schematic drawings, in which.

DETAILED DESCRIPTION OF THE PREFERRED EMBODIMENTS

Figure 1:
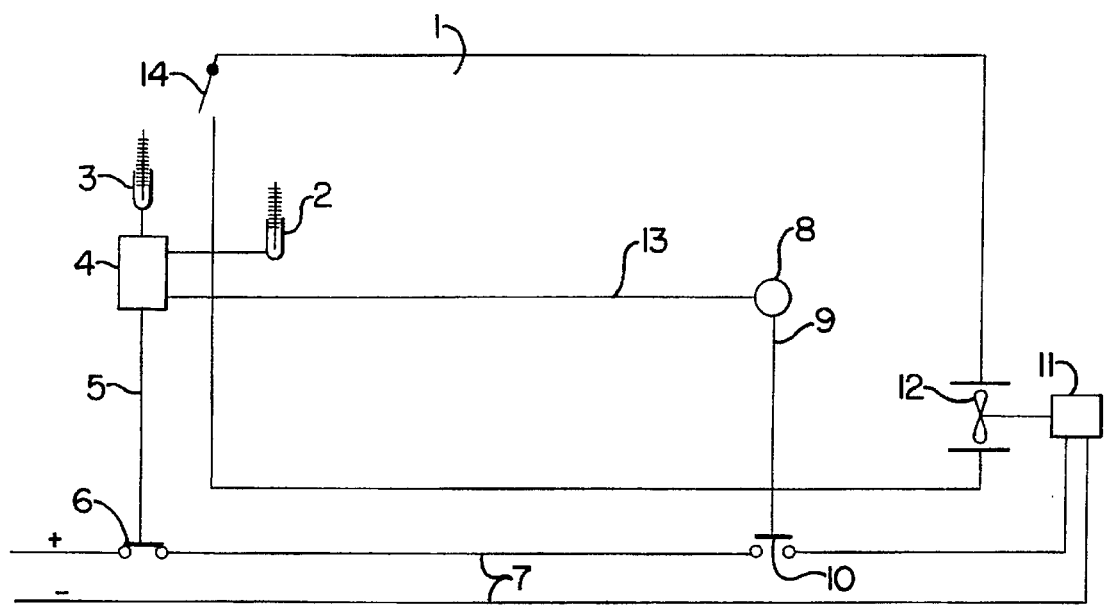
FIG. 1 is a schematic representation of a ventilated enclosed space with one ventilator and which embodies the present invention.

In FIG. 1 a temperature sensor 2 is installed inside a space 1 and a temperature sensor 3 is located where it monitors the outside temperature of the available air. Both sensors send their signals to a controller 4, which is connected with a wire 5 to a switch 6 located in an electrical circuit 7.

A thermostat 8 is connected by a wire 9 to a second switch 10 in the electrical circuit 7 in which a motor 11 of a ventilator fan 12 is located.

The electrical motor 11 is reversible, which will allow the ventilator fan 12 to turn in both directions. This incorporates the advantage that upon demand the air can either be blown into the space or in the presence of dangerous gases the air in the space may preferably be expelled, and fresh air will enter space 1 through a provided louver 14. The same effect is possible if the entire ventilation unit, motor, and ventilator fan can be turned by 180°, which may be done manually or electrically.

Louver 14 can be installed anywhere along the periphery of the space, but is preferably located on the opposite side of the ventilator fan 12. Louver 14 may comprise the type which closes under its own weight until an adjustable pressure differential opens the louver.

If the ventilator fan 12 can be reversed, the louver 14 is designed to handle both directions of the air flow going to or coming from space 1. Such louvers can also be opened or closed manually or can be operated automatically, activated by the outside air temperature or opened and closed at the same time the ventilator motor 11 is energized or shut off.

Space 1 will be cooled with outside fresh air as soon as the air temperature has sufficiently dropped. The cooling of the outside air is monitored and compared to the inside air temperature with the controller 4, which can establish such a temperature differential.

Once the adjustable necessary temperature differential is reached the controller will close the first switch 6 in the electrical circuit 7 and the motor 11 will be energized and turn on the ventilator fan 12, which will blow cooler outside air into the space.

The temperature differential is independent of the absolute readings of the temperature. As soon as positive air pressure is created in space 1 louver 14 will open and let the air escape to the outside. The air leaving the space will be replaced with approximately the same volume of fresh air coming through the ventilator. Once the air temperature in the space is approaching the outside air temperature and reaches an adjustable or pre-set minimal value, the controller 4 will open switch 6 and turn off the ventilator.

In order for motor 11 to be energized it is necessary for electrical circuit 7 to be closed at the second switch 10. In the illustrated embodiment, that switch is controlled by a separate thermostat 8, which monitors the absolute temperature in space 1.

If the absolute temperature falls to a pre-set or adjustable limit of thermostat 8, it will open switch 10 and will interrupt electrical circuit 7. This will shut off motor 11 and stop ventilator fan which will no longer blow or expel any air from space 1. It will be understood however, that the absolute temperature in the space can be determined by the controller 4 from the signal of the temperature sensor 2 which is located in the space, and with the controller 4 utilizing the thusly sensed absolute temperature to control the switch 6. In this case, the separate thermostat 8 and the separate switch 11 as illustrated in FIG. 1 would not be required.

The same apparatus can also be used for warming a space, in which case the controller reverses the mode of operation. In particular, as soon as controller 4 registers an outside air temperature sufficiently higher than the air in the space, it will activate switch 6 and close electrical circuit 7 and the motor of the ventilator fan is energized and warmer air is blown into the space 1.

In order to avoid an excessive warming of the space the thermostat 8 can be set at an upper maximum limit. If the space temperature reaches that level the thermostat will open switch 10 in circuit 7 and the ventilator fan is stopped to prevent a further increase in the temperature in the space.

By making it possible to switch the input signals from the two temperature sensors 2 and 3 to controller 4 it will not be necessary to reset the seasonal limits for winter and summer. Simply switching the input signals manually or with an electronic switch (not shown) will allow the use of the same set points and the same instruments for either cooling or warming the space.

With the possibility of exchanging the input signals to the controller the monitoring of the differential between the two temperatures will stay the same. For cooling purposes the space temperature is the minuend and the outside air temperature is the subtrahend. For warming during the winter the outside air temperature becomes the minuend and the temperature in the space the subtrahend.

The same principle also applies for an installed warm air heating system. Applying the same principle as described above, the process could be used for cooling purposes with the existing system during the summer time.

Instead of the absolute temperature as the leading parameter, monitored by a thermostat or other temperature sensor, another variable parameter can take the lead in the superpositioned control process.

For example the humidity cannot exceed a certain limit in the space. A humidity transmitter supplies the signal and the limits in the same fashion as described for the thermostat by opening or closing switch 10 in electrical circuit 7. It is also possible to have other instruments measure and monitor physical, chemical, or biological parameters of the space or goods stored in the space. The signals from these instruments are then used as the lead parameters in the control process.

In a wine cellar or with a chemical process it is particularly important that the temperature in the space is kept within a certain range during the entire year. Such an operation will normally demand a complete air conditioning system, but the present invention can lend much support and save energy when properly incorporated.

For such a purpose thermostat 8 has a double setting for the lower and upper limits which mark the desired range. As an alternative, two single limit thermostats could achieve the same result. Thermostat 8 is also connected by a wire 13 with the controller 4. Switch 10 in electric circuit 7 is connected to thermostat 8 by wire 9.

If the air temperature exceeds the pre-set upper limit and the space gets too warm, the thermostat will close switch 10 and, at the same time, sets controller 4 into a cooling mode. If the controller senses that the outside temperature is sufficiently cooler than the space temperature, the controller will activate and close the switch 6.

The electrical circuit 7 is now fully closed and the ventilator fan 12 starts to deliver outside air to the space. If the temperature differential falls below a certain pre-set minimum the controller will open switch 6 in circuit 7. The ventilation process will be halted, since it has lost its effectiveness. If the air temperature in the space falls below the upper limit and gets into the desired range, the thermostat will open switch 10 in circuit 7. In both cases ventilator fan 12 and the air circulation will be stopped.

If the air temperature of the space falls below the pre-set lower limit of the thermostat a warming of space 1 is desired. The process controls will now look for warmer outside air and the ventilation process will be activated accordingly.

As long as the temperature of the space remains within the pre-set range, circuit 7 at switch 10 stays open until the temperature exceeds the upper or lower limit of the range.

If the air temperature in the space has to be kept within an even smaller range, and the outside air temperature cannot sufficiently accommodate such a demand, it is of course always possible to install the additional necessary heating and cooling equipment to integrate the process.

It shall also be mentioned that two or more independent leading parameters can influence circuit 7 and can cause the ventilator to supply or expel air from the space.

In many areas dangerous radon gases are emitted from the ground or from the ground water. Radon can be trapped in the crawl space under the house and can find its way into the living areas of the house. If the concentration of radon gas exceeds a certain limit, it is advisable to take action immediately by venting the gas to the outside or at least reduce the level of concentration of the gas.

The same is true for explosive, or health threatening gases that can be generated for example by a fermentation process in a laboratory.

The present invention is very suitable to counteract or even prevent such emergencies. In addition to the arrangement shown in FIG. 1 a specific measuring instrument can be added to monitor and measure the concentration of a dangerous gas. As soon as a certain concentration level is detected, the instrument activates another switch (not shown) in an electrical circuit parallel to circuit 7, which bypasses switches 6 and 10. This parallel circuit will activate the ventilator fan and an emergency ventilation will take place, regardless of the temperature, humidity level, time of day, or season. Depending on conditions the ventilator fan can be controlled either by bringing fresh air to the space or by expelling the air and letting fresh air flow through the louvers.

By discharging the air from the space 1 an underpressure is created, which will let fresh air flow into the space, but it will also prevent the dangerous gases from migrating into the living quarters of a house.

Figure 2:
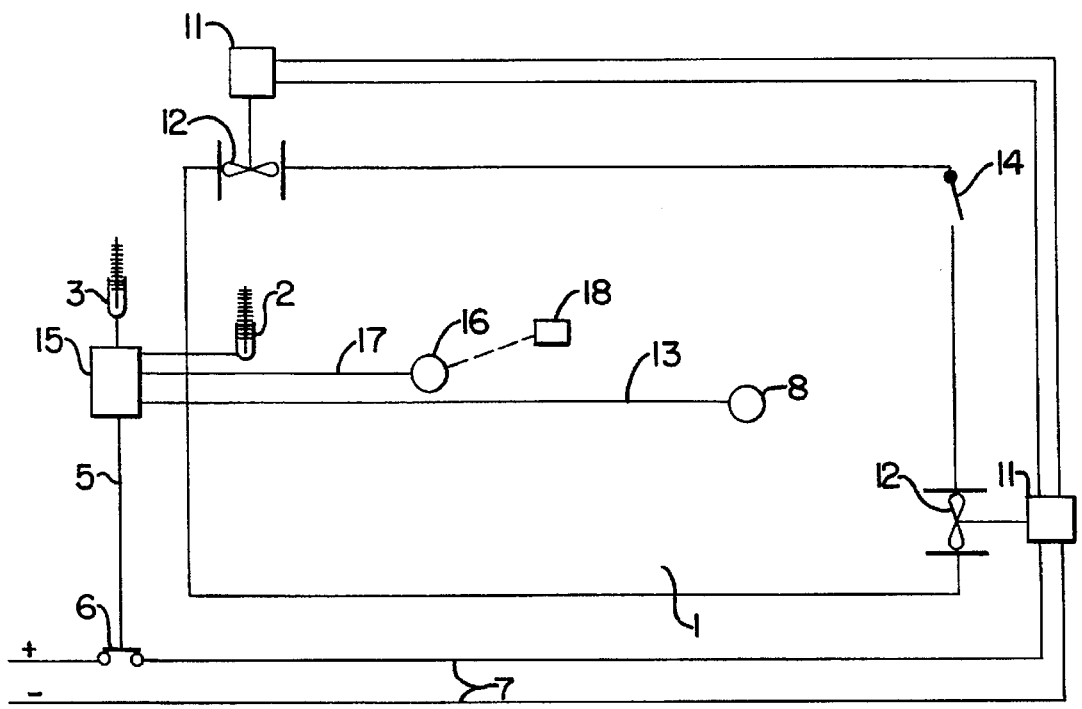
FIG. 2 shows a ventilated enclosed space with two ventilators and which also embodies the present invention.

A similar configuration is shown in FIG. 2 which provides for a forced ventilation. Temperature sensors 2 and 3 send their signals to a controller 15 to calculate the differential. Measuring unit 8 monitors the leading parameter or parameters and is directly connected with controller 15 by wire 13. The controller is connected with a single switch 6 by wire 5. Switch 6 is installed in an electric circuit 7, which is opened or closed depending on the priorities of the controller.

If circuit 7 is closed the ventilation in space 1 is activated. In this example two ventilator fans 12 are shown, which are activated simultaneously. It is advantageous if these two ventilator fans are located on opposite sides of the space, and if they are reversible, either with a motor or with a mechanical device. In principle, the process also works with only one ventilator fan.

It is understood that more than two ventilator fans can be installed, especially in large spaces and in spaces with dead corners. Best results can be achieved when half of the ventilator fans are blowing fresh air into the space and the other half are expelling the air to the outside. Such an arrangement allows the process to remain effective even when louver 14 is closed. However, the opening of the louver will help to increase the air changes. Obviously, more than one louver can be installed.

An underpressure in space 1 can be created with the appropriate selection of sizes for the ventilator fans and louvers, which can be closed tightly. The underpressure will make it almost impossible for the humidity and dangerous gases to migrate from the space into the dwelling above.

A measuring instrument 16 is installed inside space 1 which monitors the presence of one of the above mentioned gases. The instrument is directly connected to the controller 15 by a control wire 17. If the instrument senses a higher concentration of a gas, as pre-set for a maximum limit, it signals such a presence of gas to the controller 15 which closes switch 6 in circuit 7 immediately. The closed switch energizes ventilator fans 12 for an emergency ventilation, regardless of the temperature and humidity condition of the outside air.

By monitoring the duration between two ventilation cycles another kind of emergency ventilation can be incorporated into the controls. Any ventilation reduces the concentration of any trapped harmful gas in the space. If such ventilation does not take place because of unfavorable differentials between the outside and inside air, a not to exceed idle time between two cycles can be pre-set, depending on the expected levels of gas concentration. If such a time frame is exceeded, an emergency ventilation will be initiated.

As a specific example, the instrument 16 can be a sensor for sensing the amount of moisture in the structural material (normally wood), which may be exposed to decay and destruction (e.g by termites). The instrument has adjustable limits, or the signal may be compared to pre-set levels in the controller 15. If such a limit or level is too high, the controller initiates an emergency ventilation, but only if the outside air is cooler than the air in the space. Warmer air could make matters worse by depositing a layer of water (condensation) on the cooler structural material.

The emergency ventilation is terminated as soon as the instrument 16 signals a return to acceptable levels. An adjustable time limit for such an emergency ventilation is another possibility. If instrument 16 still signals high levels a new emergency ventilation cycle is initiated.

Another possibility is to provide an alarm be, which can be directly set off by instrument 16, or 18, indirectly by the controller. As soon as the instrument detects a high level and initiates an emergency ventilation an audible or optical alarm is activated.

Such an alarm can be combined with an already existing alarm system for smoke or fire, water penetration, or the failing of the air conditioning system.

In case of a combined alarm system it is advantageous to separate the alarms by different sounding sirens. As a further safety precaution, the alarm system can be designed to operate on batteries in case of power outages.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed:

1. An apparatus for ventilating an enclosed air space of a building and comprising
    first and second spaced apart openings for admitting air into and from the space,
    ventilating fan means positioned in at least one of said first and second openings,
    control means for operating said ventilating fan means so as to ventilate the space with outside air upon
        (1) the absolute temperature in the space reaching a predetermined upper limit, and the temperature of the outside air being below the temperature of the space by a predetermined differential, and so as to cool the space, and upon
        (2) the absolute temperature in the space reaching a predetermined lower limit, and the temperature of the outside air exceeding the temperature of the space by a predetermined differential, and so as to warm the space.

2. The apparatus as defined in claim 1 wherein said control means also acts to ventilate the space with outside air upon
    (3) a specific gas reaching a predetermined concentration in the space, and so as to reduce the concentration of the specific gas in the space.

3. The apparatus as defined in claim 1 wherein said control means also acts to ventilate the space with outside air upon
    (3) water vapor reaching a predetermined concentration in the space, and the temperature of the outside air being below the temperature of the air in the space, and so as to reduce the concentration of the water vapor in the space.

4. An apparatus for ventilating an enclosed air space of a building and comprising first and second spaced apart openings for admitting air into and from the space, ventilating fan means positioned in at least one of said first and second openings, an electric circuit for operating said ventilating fan means when the circuit is closed, first sensing means for sensing the temperature of the air in the space, second sensing means for sensing the temperature in the air outside the space, switch means for selectively opening and closing said electric circuit, controller means which is switchable between
(1) a cooling mode wherein the outside temperature is subtracted from the inside temperature to determine the temperature differential, and the switch means is closed if the differential reaches a predetermined minimum,
(2) a heating mode wherein the inside temperature is subtracted from the outside temperature to determine the temperature differential, and the switch means is closed if the differential reaches a predetermined minimum, and
(3) an inactive mode wherein the switch means is open, thermostat means for switching the controller means to
(1) its cooling mode when the inside temperature reaches a predetermined upper limit,
(2) its heating mode when the inside temperature reaches a predetermined lower limit, and
(3) its inactive mode when the inside temperature is between said predetermined upper and lower limits.

5. The apparatus as defined in claim 4 further comprising third sensing means for sensing the concentration of a specific gas in the space, and wherein said controller means acts to close the switch means so as to activate said ventilating fan means upon the specific gas reaching a predetermined concentration in the space and so as to reduce the concentration of the specific gas in the space regardless of the other sensed conditions.

6. The apparatus as defined in claim 5 wherein the specific gas is selected from the group consisting of radon, water vapor, and an explosive or otherwise dangerous gas.

7. The apparatus as defined in claim 6 further comprising means for generating an alarm signal when said third sensing means senses that the concentration of the specific gas reaches the predetermined concentration.

8. The apparatus as defined in claim 4 wherein said ventilating fan means is reversible so as to permit air flow in either direction through said one opening.

9. A method of ventilating an enclosed air space, comprising the steps of sensing the temperature differential between the air in the space and the outside air, sensing the absolute temperature of the air in the space, and actively ventilating the space so as to exchange air within the space with outside air whenever
(1) the temperature of the air in the space reaches a predetermined upper limit, and the temperature of the outside air is below the temperature of the air in the space by a predetermined differential, and so as to cool the space, and whenever
(2) the temperature of the air in the space reaches a predetermined lower limit, and the temperature of the outside air exceeds the temperature of the air in the space by a predetermined differential, and so as to warm the space.

10. The method as defined in claim 9 comprising the further steps of sensing the concentration of a specific gas in the space, and actively ventilating the space so as to exchange air within the space with outside air upon the concentration of the specific gas in the space reaching a predetermined level.

11. The method as defined in claim 9 comprising the further steps of sensing the concentration of water vapor within the space, and actively ventilating the space so as to exchange air within the space with outside air upon the concentration of the water vapor reaching a predetermined level and the temperature of the outside air being below the temperature of the air in the space by a predetermined amount.

12. The method as defined in claim 9 comprising the further steps of monitoring the moisture content of the building materials of the structure which defines the enclosed air space, or of other goods or products stored in the enclosed air space, and actively ventilating the space so as to exchange air within the space with outside air upon the monitored moisture content exceeding a predetermined limit value.

13. The method as defined in claim 9 comprising the further steps of monitoring the idle time after the last active ventilation of the space, and actively ventilating the space for a predetermined time upon the monitored idle time exceeding a predetermined limit value.

14. The method as defined in claim 9 wherein the step of actively ventilating the space includes forcibly delivering air into or from the space by means of a fan.

* * * * *